United States Patent [19]

Kanegae et al.

[11] Patent Number: 4,943,924

[45] Date of Patent: Jul. 24, 1990

[54] TROUBLE CHECKING APPARATUS

[75] Inventors: Hidetoshi Kanegae, Tokyo; Minoru Tomikashi, Zushi; Akira Hino; Takashi Ueno, both of Yokosuka, Japan

[73] Assignee: Nissan Motor Company, Limited, Japan

[21] Appl. No.: 66,620

[22] Filed: Jun. 26, 1987

[30] Foreign Application Priority Data

Jun. 27, 1986 [JP] Japan .................................. 61-149807
Sep. 24, 1986 [JP] Japan .................................. 61-0223802

[51] Int. Cl.$^5$ .............................................. F02B 3/00
[52] U.S. Cl. .......................... 364/431.12; 364/431.04; 364/431.09; 364/431.11; 371/9.1
[58] Field of Search ...................... 364/431.11, 431.09, 364/431.05, 431.03, 132, 133, 431.12, 431.04; 73/117.3, 118.1, 119 A; 371/9, 12; 123/479

[56] References Cited

U.S. PATENT DOCUMENTS

| | | | |
|---|---|---|---|
| 4,355,360 | 10/1982 | Asano et al. | 364/431.11 |
| 4,442,424 | 4/1984 | Shirasaki et al. | 364/431.11 X |
| 4,532,593 | 7/1985 | Mouri et al. | 364/431.11 |
| 4,532,594 | 7/1985 | Hosaka et al. | 371/9 X |
| 4,546,646 | 10/1985 | Takahashi | 73/117.3 |
| 4,556,943 | 12/1985 | Pauwels et al. | 364/431.12 |
| 4,601,199 | 7/1986 | Denz | 364/431.11 |
| 4,730,256 | 3/1988 | Niimi et al. | 364/431.12 |
| 4,764,884 | 8/1988 | Noyori | 364/431.11 X |
| 4,791,569 | 12/1988 | Suzuki | 364/431.11 X |
| 4,797,828 | 1/1989 | Suzuki et al. | 364/431.11 X |
| 4,805,576 | 2/1989 | Abe et al. | 364/431.11 X |

Primary Examiner—Eugene R. LaRoche
Assistant Examiner—Seung Ham
Attorney, Agent, or Firm—Leydig, Voit & Mayer

[57] ABSTRACT

An apparatus for analyzing control data for finding a cause of a trouble produced in a device controlled with a plurality of controlled variables. The apparatus includes sensors sensitive to a condition of the device for producing signals indicative of parameters reflective of the sensed condition. The parameter indicative signals are fed to a control circuit which calculates a valve corresponding to a setting of each of the controlled variables from a desired relationship. The calculated values are stored in time sequence along with the corresponding values of the parameter indicative signals. The stored values are transferred from the first memory to a second memory upon occurrence of a command signal indicating a trouble produced in the device. The transfer values are analyzed to find a cause of the trouble.

16 Claims, 8 Drawing Sheets

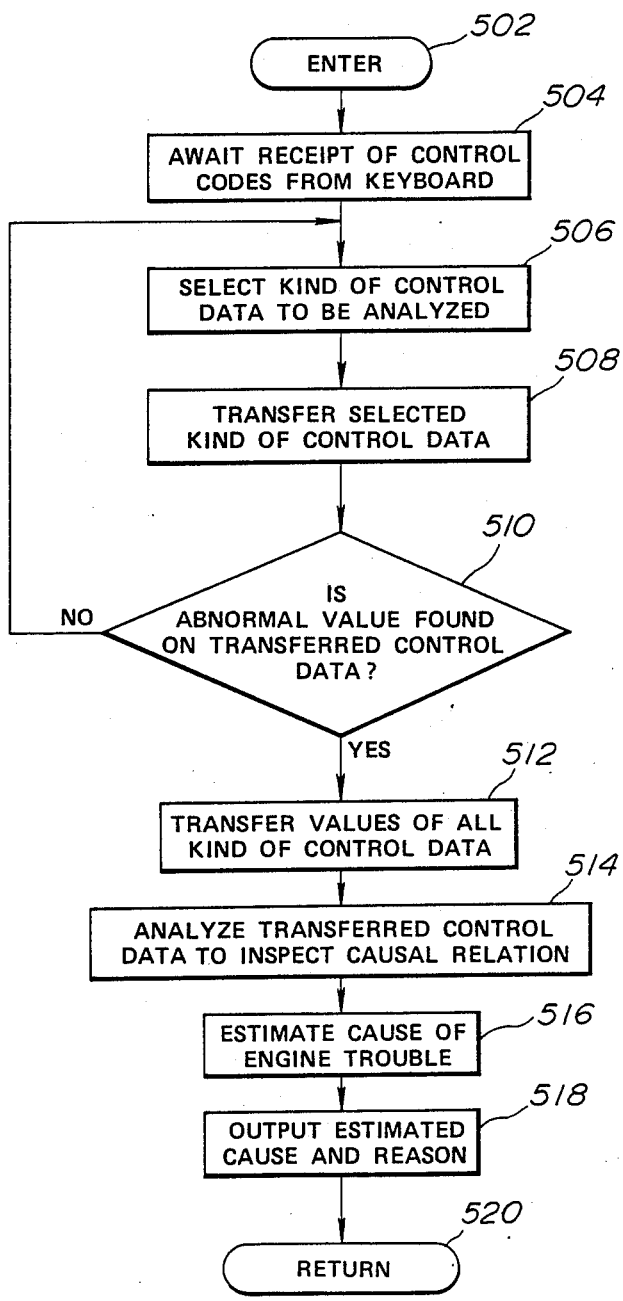

TROUBLE CHECKING APPARATUS

BACKGROUND OF THE INVENTION

This invention relates to a trouble checking apparatus for analyzing control data used in controlling a device to inspect the cause of an operation trouble in the device.

Japanese Patent Kokai No. 56-47805 discloses a trouble checking apparatus operable in accordance with a checking program for checking engine operation in certain respects while running the engine under a specified condition. Japanese Patent Kokai No. 55-162069 discloses a trouble checking apparatus which monitors a voltage signal outputted from a sensor such as a temperature sensor and provides an alarm when the monitored voltage signal is out of a range defined by predetermined upper and lower limits. Although such conventional trouble checking apparatus are satisfactory in checking a simple trouble produced in a sensor or a line connected to the sensor, their usefulness is limited in inspecting the cause of a complex trouble such as temporary engine stall.

SUMMARY OF THE INVENTION

Therefore, it is a main object of the invention to provide a trouble checking apparatus which can estimate the cause of a complex trouble produced in a device with high reliability.

There is provided, in accordance with the invention, an apparatus for use with a device used in a process, the device having at least one means for controlling the process of the device. The apparatus comprises means sensitive to a condition of the device for producing signals indicative of parameters reflective of the sensed condition. A control circuit calculates a value corresponding to a setting of the means for controlling the process of the device in response to the parameter indicative signals. The calculating is performed repetitively at uniform intervals from a relationship between the sensed condition and means for controlling the process of the device. The control circuit includes a first memory for storing the calculated value in time sequence along with the corresponding values of the parameter indicative signals, a second memory, means for generating a command signal indicating a trouble which is produced in the process of the device, means responsive to the command signal for transferring the stored values from the first memory into the second memory, and means for analyzing the transferred values to estimate the cause of the trouble.

BRIEF DESCRIPTION OF THE DRAWINGS

The present invention will be described in greater detail by reference to the following description taken in connection with the accompanying drawings, in which:

FIG. 11 is a flow diagram illustrating the programming of the digital computer used in the control data analyzing unit of FIG. 8.

DETAILED DESCRIPTION OF THE INVENTION

Figure 1:
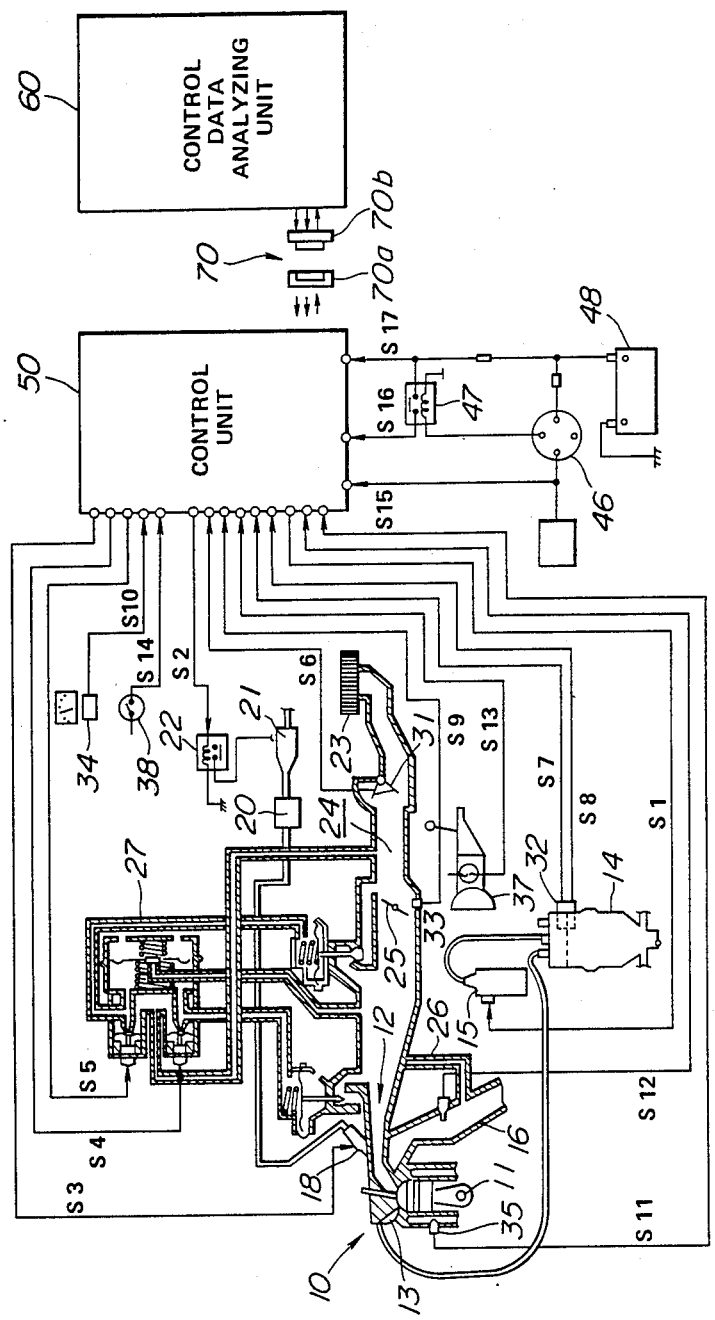
FIG. 1 is a schematic view showing one embodiment of a trouble checking apparatus made in accordance with the invention.

With reference to the drawings, and in particular to FIG. 1, there is shown a schematic diagram of an automotive vehicle trouble checking apparatus embodying the apparatus of the invention. An internal combustion engine, generally designated by the numeral 10, for an automotive vehicle includes a combustion chamber or cylinder within which a piston is mounted for reciprocal motion. A crankshaft 11 is supported for rotation within the engine 10 in response to reciprocation of the piston within the cylinder.

An intake manifold 12 is connected with the cylinder through an intake port with which an intake valve is in cooperation for regulating the entry of combustion ingredients into the cylinder from the intake manifold 12. A spark plug 13 is mounted in the top of the cylinder for igniting the combustion ingredients within the cylinder when the spark plug 13 is energized by the presence of high voltage electrical energy from a distributor 14 connected to an ignition coil 15. The distributor 14 has a rotor driven at one-half the rotational velocity of the crankshaft. As the distributor rotor rotates, it sequentially contacts distributor electrical contacts to permit high voltage electrical energy to be supplied at appropriate intervals to the spark plug 13. The spark timing of the ignition coil 15 is controlled by a spark timing control signal S1 fed to the ignition coil 15 from an control unit 50. An exhaust manifold 16 is connected with the cylinder through an exhaust port with which an exhaust valve is in cooperation for regulating the exit of combustion products, exhaust gases, from the cylinder into the exhaust manifold 16. The intake and exhaust valves are driven through a suitable linkage with the crankshaft 16.

A fuel injector 18 is connected through a pressure regulator 20 to a fuel pump 21 connected to a fuel tank (not shown). The fuel pump 21 is electrically operated when a relay 22 is energized by the presence of an electrical signal S2. The pressure regulator 20 maintains the fuel to the fuel injector 18 at a constant pressure. The fuel injector 18 opens to inject fuel into the intake manifold 12 when it is energized by the presence of an electrical pulse signal S3. The length of the electrical pulse, that is, the pulse-width, applied to the fuel injector 18 determines the length of time the fuel injector 18 opens and, thus, determines the amount of fuel injected into the intake manifold 12. Air to the engine 10 is supplied through an air cleaner 23 into an induction passage 24. The amount of air permitted to enter the combustion chamber through the intake manifold 12 is controlled by a butterfly throttle valve 25 suitable within the induction passage 24. The throttle valve 25 is connected by a mechanical linkage to an accelerator pedal.

In the operation of the engine 10, fuel is injected through the fuel injector 18 into the intake manifold 12 and mixed with the air therein. When the intake valve opens, the air-fuel mixture enters the combustion chamber. An upward stroke of the piston compresses the air-fuel mixture, which is then ignited by a spark produced by the spark plug 13 in the combustion chamber. Combustion of the air-fuel mixture in the combustion chamber takes place, releasing heat energy, which is converted into mechanical energy upon the power stroke of the piston. At or near the end of the power stroke, the exhaust valve opens and the exhaust gases are discharged into the exhaust manifold 16. Most of the exhaust gases are discharged to the atmosphere through an exhaust system (not shown). Some of the exhaust gases are recirculated to the combustion chamber through an exhaust gas recirculation (EGR) system including an EGR passage 26 having an EGR valve placed therein for controlling the amount of exhaust gases flowing therethrough. The numeral 27 designates a VCM valve 27 having control valves which are responsive to respective control signals S4 and S5 for controlling the amount of air introduced into the induction passage 24 through a passage bypassing the throttle valve 25.

Although the engine 10 as illustrated in FIG. 1 shows only one combustion chamber formed by a cylinder and piston, it should be understood that the engine control system described herein is designated for use on a multi-cylinder engine. Thus, it should be understood that there are a plurality of cylinders, and also intake valves, exhaust valves and reciprocating pistons, spark plugs, and fuel injectors related to the number of cylinders in the engine 10.

The amount of fuel metered to the engine, this being determined by the width of the electrical pulse S3 applied to the fuel injector 18, the fuel injection timing, and the ignition-system spark timing are repetitively determined from calculations performed by the control unit 50, these calculations being based upon various conditions of the engine 10 that are sensed during its operation. These sensed conditions include intake air flow, engine speed, throttle valve position, spark advance, vehicle speed, cylinder-head coolant temperature, exhaust gas oxygen concentration, transmission gear position, air conditioner switch position, and so on. Thus, an airflow meter 31, an engine speed sensor 32, an idle switch 33, a vehicle speed sensor 34, a cylinder-head coolant temperature sensor 35, an oxygen sensor 36, a neutral switch 37, and an air conditioner switch 38 are connected to the control unit 50.

The airflow meter 31 is sensitive to the amount of air introduced into the induction passage 24 and produces an electrical signal S6 indicative of the sensed air amount. The engine speed sensor 32 may comprise a crankshaft position sensor and a reference pulse generator for producing an engine rotation signal S7 having a series of crankshaft position electrical pulses, each corresponding to one degree of rotation of the engine crankshaft, of a repetition rate directly proportional to engine speed and a reference electrical pulse S8 at a predetermined number of degrees before the top dead center position of each engine piston, respectively. The idle switch 33 produces an electrical signal S9 at idle conditions where the throttle valve 25 is at or near its closed position. The vehicle speed sensor 34 is sensitive to the speed of travel of the automotive vehicle and it produces an electrical signal S10 indicative of the sensed vehicle speed. The cylinder-head coolant temperature sensor 35 is mounted in the engine cooling system and comprises a thermistor connected in an electrical circuit capable of producing a DC voltage S11 having a variable level proportional to coolant temperature. The oxygen sensor 36 monitors the oxygen content of the exhaust and provides an electrical signal S12 indicative of the air-fuel ratio at which the engine is operating. The neutral switch 37 is responsive to the position of the transmission gear in neutral for generating an electrical signal S13. The air conditioner switch 38 provides an electrical signal S14 when the air conditioner is in operation. The character S15 designates a start signal fed from an ignition key switch 46, the character S16 designates an "ON" signal fed from an ignition relay 47, and the character S17 designates a battery voltage signal indicative of the voltage of a vehicle battery 48.

Figure 2:
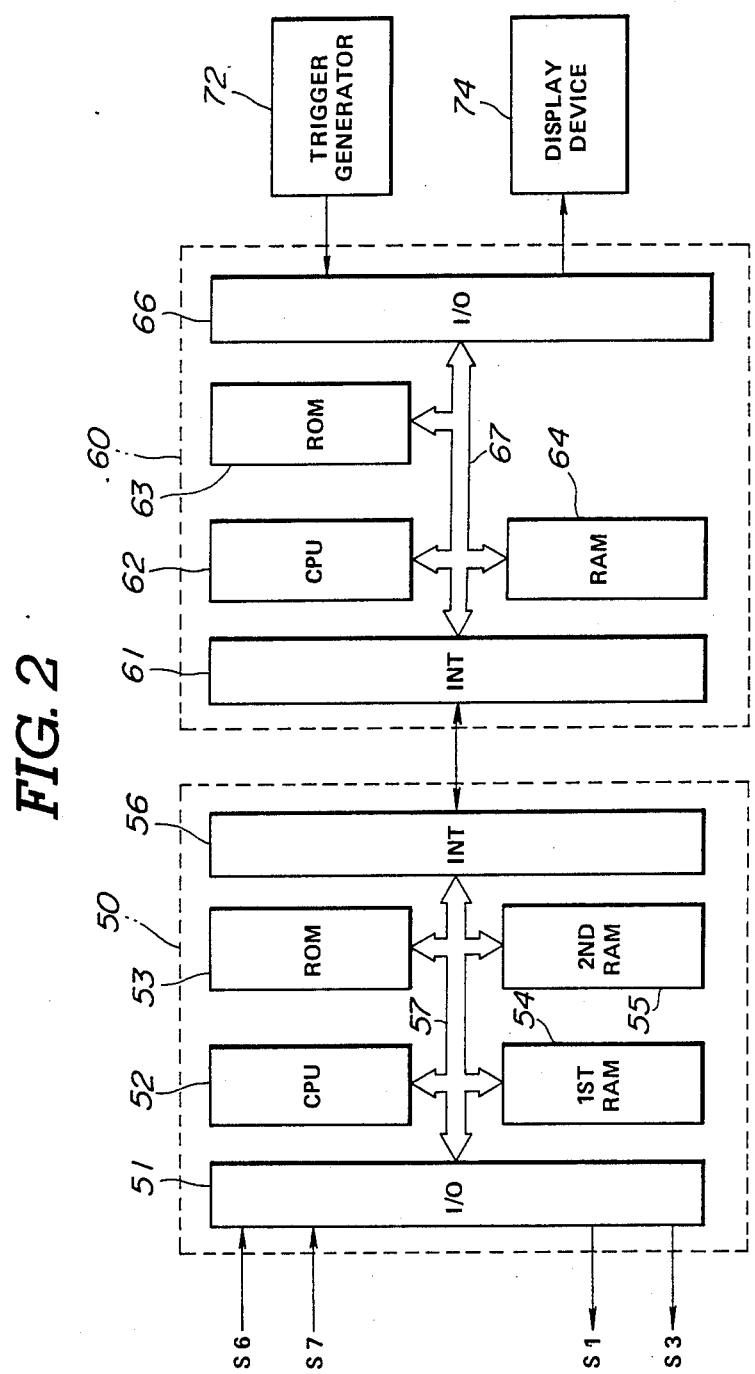
FIG. 2 is a block diagram showing the control unit and the control data analyzing unit.

Referring to FIG. 2, the control unit 50 employs a digital computer which includes an input/output control circuit (I/O) 51, a central processing unit (CPU) 52, a read only memory (ROM) 53, a first control random access memory (1ST RAM) 54, a second control random access memory (2ND RAM) 55, and an interface circuit (INT) 56. The central processing unit 52 communicates with the rest of the computer via data bus 57. The input/output control circuit 51 includes a signal shaper and amplifier, an analog multiplexer, an analog-to-digital converter, a fuel injection control circuit, and a spark timing control circuit. The signal shaper and amplifier receives the engine rotation signal S7 fed thereto from the engine speed sensor 32 and it amplifies and shapes the alternating engine rotation signal. The analog multiplexer receives analog signals from the various sensors. The analog-to-digital converter converts the various inputs to the analog multiplexer, one by one, into digital form for application to the central processing unit 52. The A to D conversion process is initiated on command from the central processing unit 52 which selects the input channel to be converted. The read only memory 53 contains the program for operating the central processing unit 52 and further contains appropriate data in look-up tables used in calculating appropriate values for fuel-injection pulse-width and ignition-system spark-timing. The look-up data may be obtained experimentally or derived empirically. Control words specifying a desired spark timing are periodically transferred by the central processing unit 52 to the spark timing control circuit which converts it into a control signal S1 for controlling the spark timing of the ignition system. Similarly, control words specifying a desired fuel-injection pulse-width are periodically transferred by the central processing unit 52 to the fuel injection control circuit which converts it into a control signal S3 for controlling the operation of the fuel injector 18. The first control memory 54 stores control data including the values calculated repetitively for fuel-injection pulse-width and ignition-system spark-timing in time sequence along with the corresponding engine-speed and intake-airflow values. The central processing unit 52 monitors the engine rotation signal S7 and transfers the control data from the first control memory 54 to the second control memory 55 when the engine rotation signal S7 varies in an abnormal manner indicating engine stall. The interface circuit 56 is used to connect the control unit 50 to a control data analyzing unit 60 through a connector 70 having two mating pieces 70a and 70b.

The control data analyzing unit 60 employs a digital computer which includes an interface circuit (INT) 61, a central processing unit (CPU) 62, a read only memory (ROM) 63, a first analyzer random access memory (RAM) 64, and an input/output control circuit (I/O) 66. The central processing unit 62 communicates with the rest of the computer via data bus 67. The interface circuit 61 is used to connect the control data analyzing unit 60 to the control unit 50 through the connector 70. The read only memory 63 contains the program for operating the central processing unit 62. The input/output control circuit 66 is connected to a trigger signal generator 72 and also to a display device 74 such as LED, CRT or the like. The trigger signal generator 72 produces a trigger signal when the operator operates a switch provided therein. The central processing unit 62 provides a command to cause the control unit 50 to transfer the control data from the second control memory 55 to the memory 64 when a trigger signal is generated to the first analyzer control data analyzing unit 60. The central processing unit 62 analyzes the first analyzer transferred into the memory 64 to inspect the cause of the engine trouble (engine stall). The inspected cause are outputted through the input/output control circuit 66 to indicate it on the display device 74.

Figure 3:
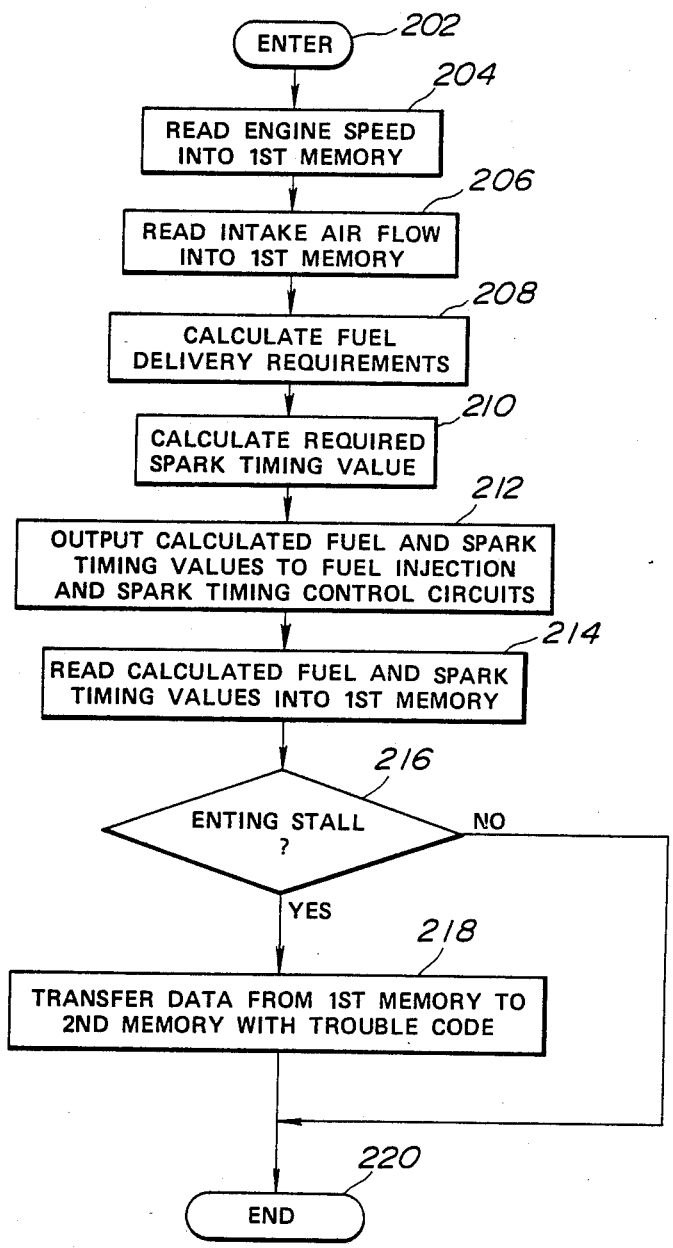
FIG. 3 is a flow diagram illustrating the programming of the digital computer used in the control unit.

FIG. 3 is a flow diagram illustrating the programming of the digital computer used in the control unit 50. The computer program is entered at step 202 at predetermined time intervals or at uniform angular intervals of rotation of the engine crankshaft. At step 204, the engine angular velocity, or speed, which may be calculated from the interval between the most recent crankshaft position pulses, is read into the first control memory 54. At step 206, the intake airflow signal S6 is converted by the analog-to-digital converter to digital form and read into the first control memory 54.

At step 208, the fuel-delivery requirement, in the form of fuel-injection pulse-width and timing, is calculated by the digital computer central processing unit 52 from an relationship programmed into the computer. This relationship defines this controlled variable EGI as a function of intake airflow QA and engine speed RPM. The digital computer in calculating the fuel-injection pulse-width EGI simply looks at the engine-speed and intake-airflow values RPM and QA previously read into the first memory, selects a constant K, and makes the calculation of EGI by dividing the intake airflow QA by the engine speed RPM and multiplying the resulting quotient by the constant K. At step 210, the required ignition-system spark-timing is calculated by the digital computer central processing unit 52. This calculation is made with the use of a relationship that specifies this controlled variable ADV in terms of engine speed RPM and fuel-injection pulse-width EGI.

At step 212, the calculated values for fuel-injection pulsewidth, fuel-injection timing, and ignition-system spark-timing are transferred via the data bus 57 respectively to the fuel-injection control circuit and the spark-timing control circuit included in the input/output control circuit 51. The fuel injection control circuit then sets the fuel-injection timing and the fuel-injection pulse-width according the calculated values for them to cause the fuel injector 18 to open for a length of time calculated by the computer. Similarly, the spark timing control circuit sets the spark-timing to cause an ignition spark to be produced at the time calculated by the computer.

Figure 4:
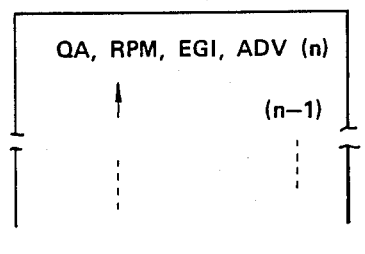
FIG. 4 is a diagram illustrating the control data accumulated in the control unit.

At step 214, the calculated values EGI and ADV for fuel-injection pulse-width and ignition-system spark-timing are read into the first control memory 54. As a result, the values of the read intake airflow QA, the read engine speed RPM, the calculated fuel-injection pulse-width EGI and the calculated ignition-system spark-timing ADV are accumulated at intervals to form control data in the first control memory 54, as shown in FIG. 4.

Figure 5:
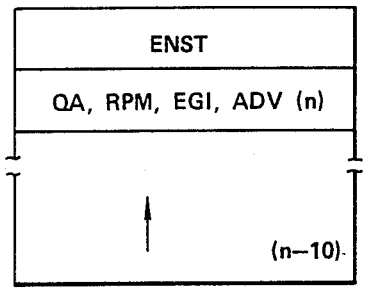
FIG. 5 is a diagram illustrating the control data transferred into the control data analyzing unit.

At step 216, a determination is made as to whether or not the engine stalls. This determination is made by using the crankshaft position electrical pulses fed from the engine rotation sensor 32. If the answer to this question is "yes", then the program proceeds to step 218 where the digital computer central processing unit 52 transfers a predetermined set of the most recent data from the first control memory 54 to the second control memory 55. As a result, the second memory 55 stores the transferred control data along with a trouble code (ENST) which indicates that the engine stalls, as shown in FIG. 5. Following this, the program proceeds to the end at step 220. If the answer to the question inputted at step 216 is "no", then the program proceeds directly to step 220.

Figure 6:
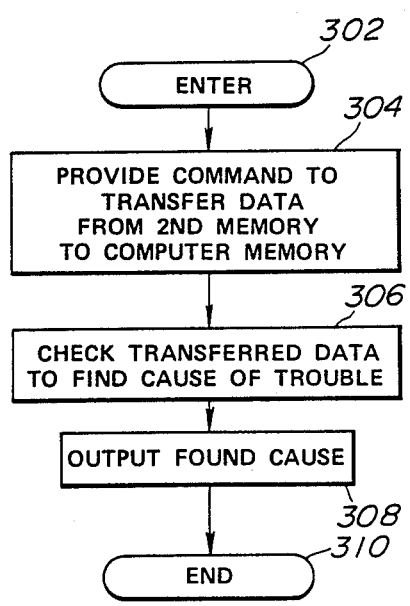
FIG. 6 is a flow diagram illustrating the programming of the digital computer used in the control data analyzing unit.

FIG. 6 is a flow diagram illustrating the programming of the digital computer used in the control data analyzing unit 60. The computer program is entered at step 302 each time a trigger pulse is generated from the trigger signal generator 72. At 304, the digital computer central processing unit 62 provides a command to cause the control unit 50 to transfer the accumulated data from the control memory 55 to the first analyzer memory 64.

Figure 7:
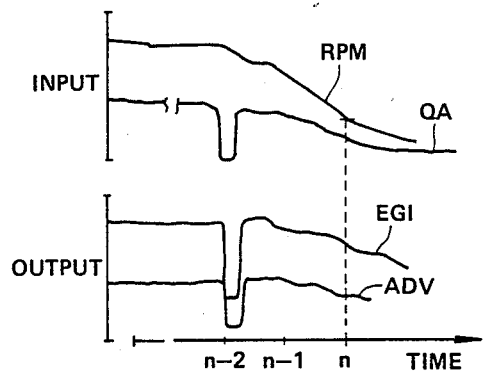
FIG. 7 is a time chart illustrating variations in the values of the control data stored in the control data analyzing unit.

At step 306, the digital computer central processing unit 62 analyzes the transferred control data to find the cause of the engine stall according to a predetermined rule programmed into the computer. Assuming now that the transferred control data provide such relationships as shown in FIG. 7 which shows variations in the stored values RPM, QA, EGI and ACV included in the transferred control data on the same time scale, the digital computer estimates that the engine stall was caused by a temporary drop in intake airflow QA. At step 308, the digital computer central processing unit 62 outputs the found cause to indicate it on the display device 74. Following this, the program proceeds to the end at step 310.

Figure 8:
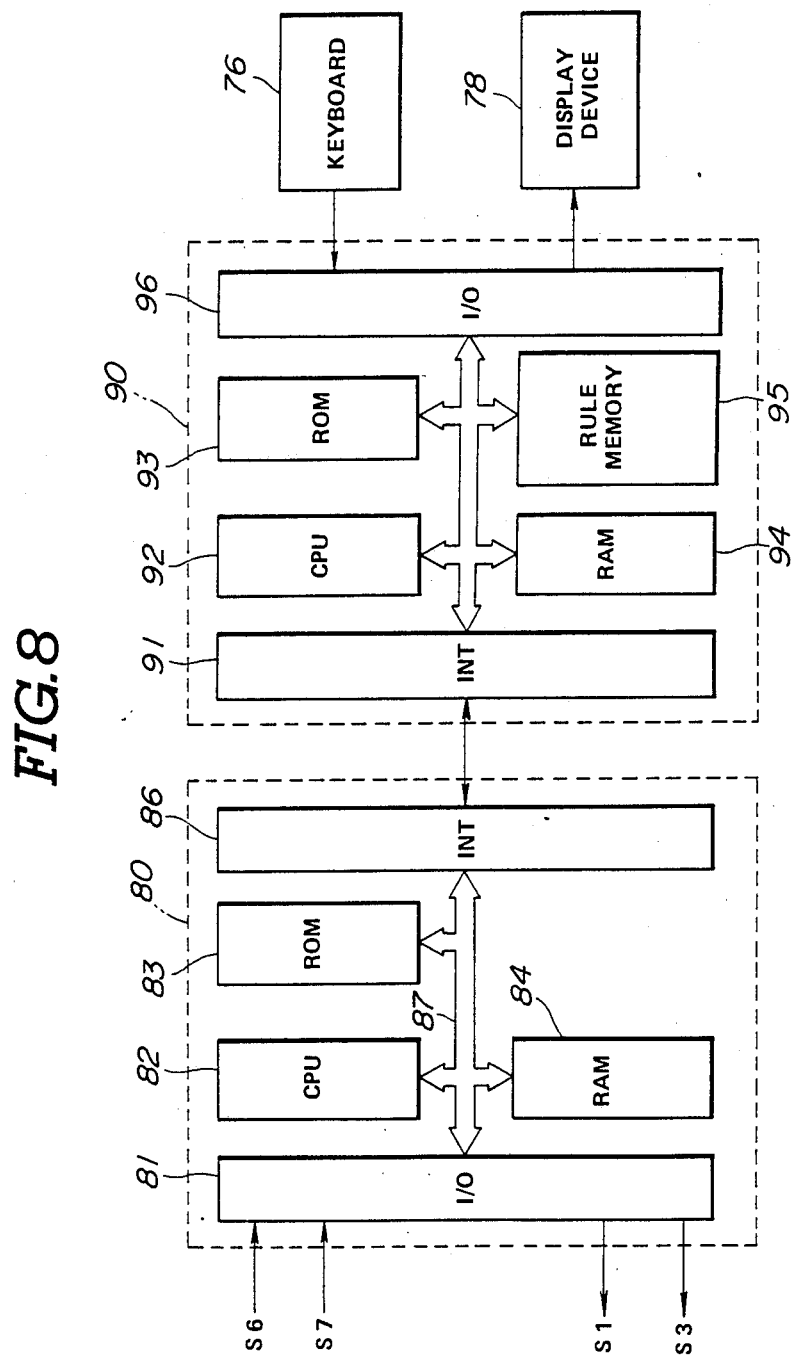
FIG. 8 is a block diagram showing a second embodiment of the trouble checking apparatus of the invention.

Referring to FIG. 8, there is illustrated a second embodiment of the control data analyzing apparatus of the invention.

In this embodiment, the control unit, generally designated by the numeral 80, employs a digital computer which includes an input/output control circuit (I/O) 81, a central processing unit (CPU) 82, a read only memory (ROM) 83, a first control random access memory (RAM) 84, and an interface circuit (INT) 86. The central processing unit 82 communicates with the rest of the computer via data bus 87. The input/output control circuit 81 includes a signal shaper and amplifier, an analog multiplexer, an analog-to-digital converter, a fuel injection control circuit, and a spark timing control circuit. The signal shaper and amplifier receives the engine rotation signal S7 fed thereto from the engine speed sensor 32 and it amplifies and shapes the alternating engine rotation signal. The analog multiplexer receives analog signals from the various sensors. The analog-to-digital converter converts the various inputs to the analog multiplexer, one by one, into digital form for application to the central processing unit 82. The A to D conversion process is initiated on command from the central processing unit 82 which selects the input channel to be converted. The read only memory 83 contains the program for operating the central processing unit 82 and further contains appropriate data in look-up tables used in calculating appropriate values for fuel-injection pulse-width and ignition-system spark-timing. The look-up data may be obtained experimentally or derived empirically. Control words specifying a desired spark timing are periodically transferred by the central processing unit 82 to the spark timing control circuit which converts it into a control signal S1 for controlling the spark timing of the ignition system. Similarly, control words specifying a desired fuel-injection pulse-width are periodically transferred by the central processing unit 82 to the fuel injection control circuit which converts it into a control signal S3 for controlling the operation of the fuel injector 18. The first control memory 84 stores the values calculated for fuel-injection pulse-width and ignition-system spark-timing in time sequence along with the corresponding engine-speed and intake-airflow values. The interface circuit 86 is used to connect the control unit 80 to the control data analyzing unit 90 through the connector 70.

Figure 9:
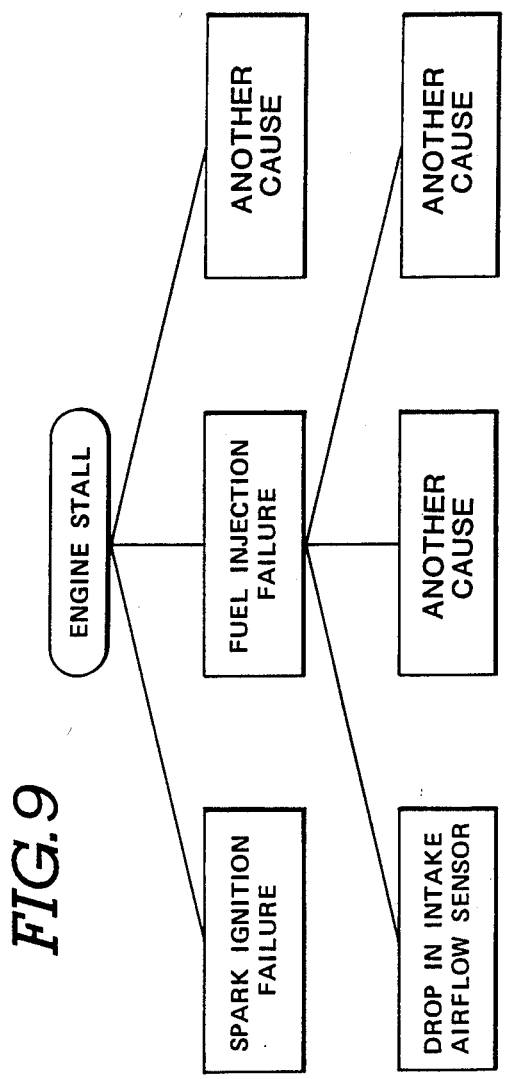
FIG. 9 is a diagram showing one example of rule tree stored in the rule memory included in the control data analyzing unit of FIG. 8.

The control data analyzing unit 90 employs a digital computer which includes an interface circuit (INT) 91, a central processing unit (CPU) 92, a read only memory (ROM) 93, a first analyzer random access memory (RAM) 94, a rule memory 95, and an input/output control circuit (I/O) 96. The central processing unit 92 communicates with the rest of the computer via data bus 97. The interface circuit 91 is used to connect the control data analyzing unit 90 to the control unit 80 through the conductor 70. The read only memory 93 contains the program for operating the central processing unit 92. The input/output control circuit 96 is connected to a keyboard 76 and also to a display device 78 such as LED, CRT or the like. The keyboard 76 is used to input information necessary in analyzing the control data. The information includes control codes indicating the kind of engine trouble, the kind of automotive vehicle, and other necessary information. The central processing unit 92 provides a command to cause the control unit 80 to transfer the control data from the first control memory 84 to the first control memory 94 when the keyboard 76 is used to input such information into the control data analyzing unit 90. The information inputted from the keyboard 76 may include a control code specifying the number of sets of the most recent values to be transferred by the central processing unit 92 from the first control memory 84 to the first analyzer memory 94. The first control rule memory 95 stores a number of rules or relationships according to which the central processing unit 92 analyzes the control data stored in the first analyzer memory 94. Each of the relationships defines an engine trouble in connection with its cause in such a manner as "if this kind of engine trouble occurs, then it is caused by A". For example, the rule memory 95 may store a first rule such that "if engine stalls, then a failure may occur in spark ignition", a second rule such that "if engine stalls, a failure may occur in fuel injection", a third rule such that "if a failure occurs in fuel injection, then a failure may occur in intake airflow measurement", . . . , as shown in FIG. 9. The central processing unit 92 makes a search for a desired relationship in the rule memory 95 based on the information inputted from the keyboard 76 and analyze the control data according to the selected rule to estimate the cause of the engine trouble (engine stall). The estimated cause are outputted through the input/output control circuit 96 to indicate it on the display device 78.

It is to be noted that since the control data analyzing unit 90 is arranged substantially in the same manner as an expert system, it is possible to facilitate control data maintenance, employ a simple program, and provide reliable engine trouble checking.

Figure 10:
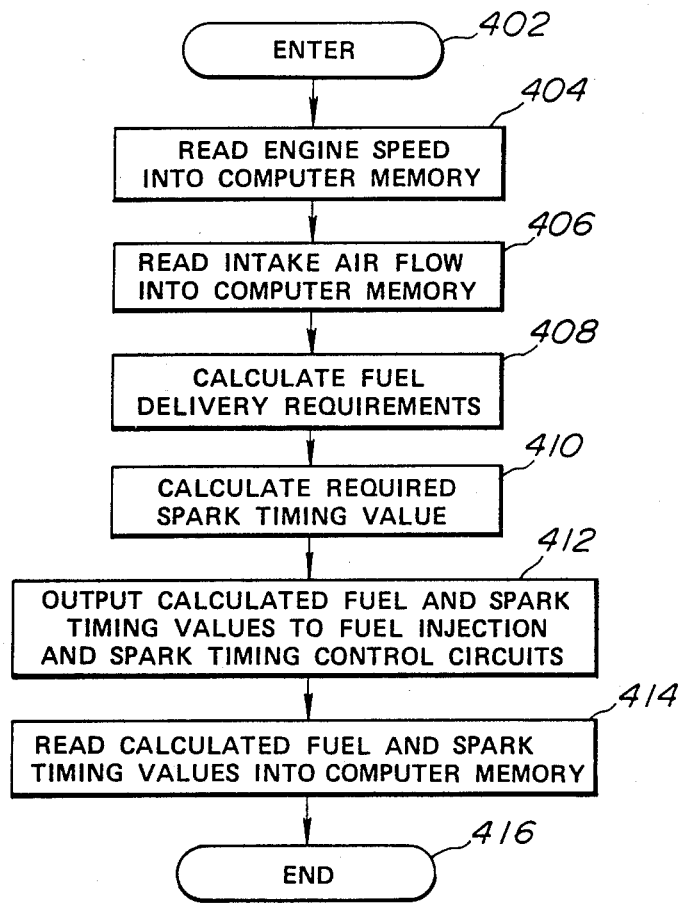
FIG. 10 is a flow diagram illustrating the programming of the digital computer used in the control unit of FIG. 8.

FIG. 10 is a flow diagram illustrating the programming of the digital computer used in the control unit 80. The computer program is entered at step 402 at predetermined time intervals or at uniform angular intervals of rotation of the engine crankshaft. At step 404, the engine angular velocity, or speed, which may be calculated from the interval between the most recent crankshaft position pulses, is read into the first control memory 84. At step 406, the intake airflow signal S6 is converted by the analog-to-digital converter to digital form and read into the first memory 84.

At step 408, the fuel-delivery requirement, in the form of fuel-injection pulse-width and timing, is calculated by the digital computer central processing unit 82 from a relationship programmed into the computer. This relationship defines this controlled variable EGI as a function of intake airflow QA and engine speed RPM. The digital computer in calculating the fuel-injection pulse-width EGI simply looks at the engine-speed and intake-airflow values RPM and QA previously read into the first memory, selects a constant K, and makes the calculation of EGI by dividing the intake airflow QA by the engine speed RPM and multiplying the resulting quotient by the constant K. At step 410, the required ignition-system spark-timing is calculated by the digital computer central processing unit 82. This calculation is made with the use of a relationship that specifies this controlled variable ADV in terms of engine speed RPM and fuel-injection pulse-width EGI.

At step 412, the calculated values for fuel-injection pulse-width, fuel-injection timing, and ignition-system spark-timing are transferred via the data bus 87 respectively to the fuel-injection control circuit and the spark-timing control circuit included in the input/output control circuit 81. The fuel injection control circuit then sets the fuel-injection timing and the fuel-injection pulse-width according the calculated values for them to cause the fuel injector 18 to open for a length of time calculated by the computer. Similarly, the spark timing control circuit sets the spark-timing to cause an ignition spark to be produced at the time calculated by the computer.

At step 414, the calculated values EGI and ADV for fuel-injection pulse-width and ignition-system spark-timing are read into the first control memory 84. As a result, data including the read intake airflow QA, the read engine speed RPM, the calculated fuel-injection pulse-width EGI and the calculated ignition-system spark-timing ADV are accumulated at intervals in the same manner as described in connection with FIG. 4. Following this, the program proceeds to the end at step 416.

FIG. 11 is a flow diagram illustrating the programming of the digital computer used in the control data analyzing unit 90. The computer program is entered at step 502. At step 504, the digital computer central processing unit 92 awaits the receipt of control codes inputted from the keyboard 76. The inputted control codes may include an engine trouble code specifying what kind of trouble occur, an vehicle type code specifying what sort of automotive vehicle is used, an engine type code specifying what type of engine is used, and so on.

At step 506, the digital computer central processing unit 92 selects a kind of control data to be analyzed. This selection is performed by making a search for a rule stored in the rule memory 95 in accordance with the engine trouble code inputted from the keyboard 76. Assuming now that the inputted engine trouble code indicates engine stall, the digital computer central processing unit 92 makes searches for the rules stored in the rule memory 95 and estimates that the engine trouble is caused by a failure in the ignition system, fuel injection system, or other engine control systems. At step 508, the digital computer central processing unit 92 provides a command to cause the control unit 80 to transfer the selected kind of control data into the first analyzer memory 94. If the ignition system should be checked, the control data related to ignition-system spark-timing are transferred into the first analyzer memory 94. If the fuel injection system should be checked, the control data related to fuel-injection pulse-width are transferred into the first analyzer memory 94. The keyboard 76 may input a control code specifying time limits to cause the control unit 80 to transfer the selected kind of control data obtained in the time interval defined by the specified time limits.

At step 510, a determination is made as to whether or not the transferred control data have an abnormal value stored at a time just before the trouble occurs. If the answer to this question is "no", then it means that there is a value quite different from the values before and after the value and the program returns to the point 506 where another kind of control data are selected for analysis. Otherwise, the program proceeds to step 512 where values of all kinds of control data obtained around the time at which the trouble occurs are transferred from the first control memory 84 to the first control memory 94.

At step 514, the digital computer central processing unit 92 analyzes the control data transferred to the first analyzer memory 94 to find a causal relation, for example that a fuel injection failure is caused by a drop in the intake airflow signal. At step 516, the digital computer central processing unit 92 estimates a cause based upon the causal relationship inspected at step 514. Assuming now that the control codes inputted at step 504 include a code specifying that the engine stalls in the course of travelling of the automotive vehicle on a rough road, the digital computer central processing unit 92 looks at a rule such that "if an abnormal condition appears on the sensor output signal when the vehicle is subject to great vibrations, then a failure will occur in the sensor connector" and it estimates the sensor connector failure as the cause of the engine trouble. At step 518, the estimated cause and the reason are outputted to indicate them on the display unit 78. Following this, the program proceeds to step 520 where the computer program returns to step 502 to await the receipt of the next control codes from the keyboard 76.

Although the invention has been described in connection with the estimation of the cause of engine stall, it is to be noted that the engine trouble to be estimated by the invention is not limited in any way to engine stall. In addition, although the invention has been described in connection with an automotive vehicle internal combustion engine, it is to be noted that the invention is also applicable to other various kinds of devices.

What is claimed is:

1. An apparatus for use with a device having at least one means for controlling the device, the apparatus comprising:

sensor means sensitive to operating conditions of the device for generating sensor signals indicative of sensed device operating conditions;

a control unit including a first control memory, means responsive to the sensor signals for generating existing values of the sensor signals, means for calculating a value corresponding to a setting of the means for controlling the device from a relationship between the generated existing sensor signal values and the means for controlling the device, the calculating being performed repetitively at uniform intervals, means for converting the calculated value into a setting of the means for controlling the device, means for storing the generated existing sensor signal values in time sequence into the first control memory to provide input data representing variations of the respective sensor signals with time, and means for storing the calculated value in time sequence into the first control memory to provide output data representing variations of the setting of the means for controlling the device with time; and an analyzing unit including a first analyzer memory, means for manually generating a command signal, means responsive to the command signal for transferring the input and output data from the first control memory to the first analyzer memory, and means for analyzing the input and output data transferred to the first analyzer memory to find a cause of a trouble in the operation of the device.

2. The apparatus of claim 1 further comprising means for detecting an abnormal condition in the input and output data to find a cause of the trouble.

3. The apparatus of claim 1 further comprising a connector for detachably connecting the control unit to the analyzing unit.

4. The apparatus of claim 1 wherein the control unit includes a second control memory, means sensitive to an abnormal condition of at least one of the sensor signals for producing a trouble indication signal, and means responsive to the trouble indication signal for transferring the most recent input and output data from the first control memory to the second control memory and wherein the analyzing unit includes means responsive to the command signal for transferring the most recent data from the second control memory to the first analyzer memory.

5. The apparatus of claim 1 wherein the command signal generating means includes a keyboard for inputting information to the apparatus, the information being necessary in analyzing the input and output data transferred to the first analyzer memory.

6. The apparatus of claim 5 further comprising a rule memory storing a number of relationships, each defining a trouble in connection with a cause of the trouble, means for selecting one of the relationships stored in the rule memory based on the information inputted from the keyboard, and means for analyzing the input and output data stored in the first analyzer memory according to the selected relationship to find the cause.

7. The apparatus of claim 6 further comprising means for selecting another relationship from the second control memory when no cause is found in the course of analyzing the input and output data stored in the first analyzer memory according to a relationship selected previously.

8. An apparatus for use with an internal combustion engine having a plurality of means for controlling the engine, the apparatus comprising:
sensor means sensitive to operating conditions of the engine for generating sensor signals indicative of sensed device engine operating conditions;
a control unit including a first control memory, means responsive to the sensor signals for generating existing values of the sensor signals, means for calculating a value corresponding to a setting of each of the means for controlling the engine from a relationship between the generated existing sensor signal values and the means for controlling the engine, the calculating being performed repetitively at uniform intervals, means for converting the calculated value into a setting of the corresponding one of the means for controlling the engine, means for storing the generated existing sensor signal values in time sequence into the first control memory to provide input data representing variations of the respective sensor signals with time, and means for storing the calculated values in time sequence into the first control memory to provide output data representing variations of the respective settings of the means for controlling the engine with time; and
an analyzing unit including a first analyzer memory, means for manually generating a command signal, means responsive to the command signal for transferring the input and output data from the first control memory to the first analyzer memory, and means for analyzing the input and output data transferred to the first analyzer memory to find a cause of a trouble in the operation of the engine.

9. The apparatus of claim 8 further comprising means for detecting an abnormal condition in the input and output data to find a cause of the trouble.

10. The apparatus of claim 8 further comprising a connector for detachably connecting the control unit to the analyzing unit.

11. The apparatus of claim 8 wherein the sensor signals include an engine rotation signal having a series of pulses produced at a repetitive rate proportional to engine speed.

12. The apparatus of claim 11 wherein the control unit includes a second control memory means sensitive to an abnormal condition of the engine rotation signal for producing an engine stall indication signal, and means responsive to the engine stall indication signal for transferring the most recent input and output data from the first control memory to the second control memory and wherein the analyzing unit includes means responsive to the command signal for transferring the most recent data from the second control memory to the first analyzer memory.

13. The apparatus of claim 8 wherein the command signal generating means includes a keyboard for inputting information to the apparatus, the information being necessary in analyzing the input and output data transferred to the first analyzer memory.

14. The apparatus of claim 13 wherein the means for analyzing further comprises a rule memory storing a number of relationships, each defining a trouble in connection with a cause of the trouble, means for selecting one of the relationships stored in a rule memory based on the information inputted from the keyboard, and means for analyzing the input and output data stored in the first analyzer memory according to the selected relationship to find the cause.

15. The apparatus of claim 14 wherein the inputted information includes information indicating that the engine trouble is engine stall and wherein the relationships include a first relationship defining engine stall in connection with a failure in spark ignition, a second relationship defining engine stall in connection with a failure in fuel injection, and a third relationship defining engine stall in connection with intake air flow measurement.

16. The apparatus of claim 15 further comprising means for selecting another relationship from the second control memory when no cause is found in the course of analyzing the input and output data stored in the first analyzer memory according to a relationship selected previously.

* * * * *

UNITED STATES PATENT AND TRADEMARK OFFICE
CERTIFICATE OF CORRECTION

PATENT NO. : 4,943,924

DATED : July 24, 1990

INVENTOR(S) : Kanegae et al.

It is certified that error appears in the above-identified patent and that said Letters Patent is hereby corrected as shown below:

Title page:
Under item [30], Foreign Application Priority Data, change "61-0223802" to --61-223802--.

Column 12, line 9, after "memory" insert --,--.

Signed and Sealed this

Eighteenth Day of February, 1992

Attest:

HARRY F. MANBECK, JR.

*Attesting Officer*  *Commissioner of Patents and Trademarks*